S. W. SCOTT.
PNEUMATIC SUPPORT AND SHOCK ABSORBER FOR VEHICLES.
APPLICATION FILED JULY 17, 1912.
1,089,974.
Patented Mar. 10, 1914.
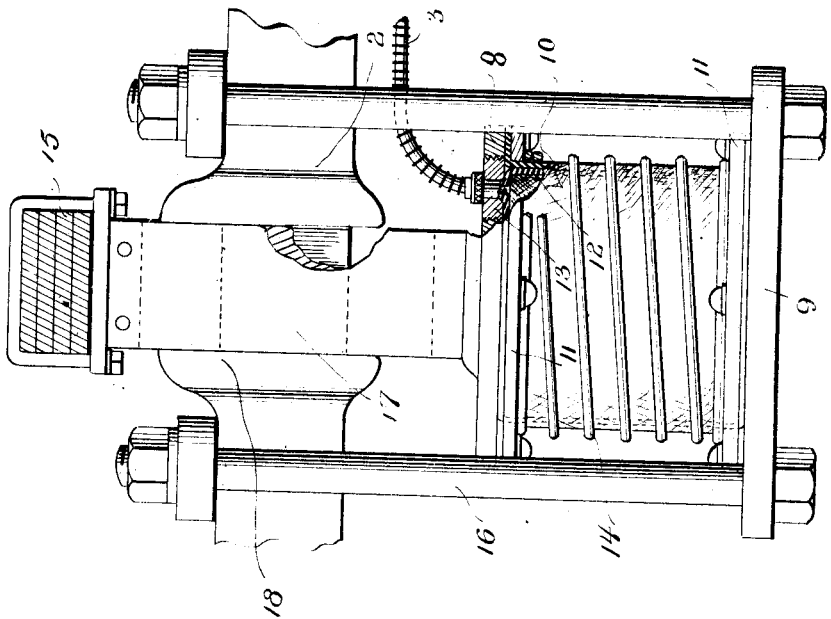
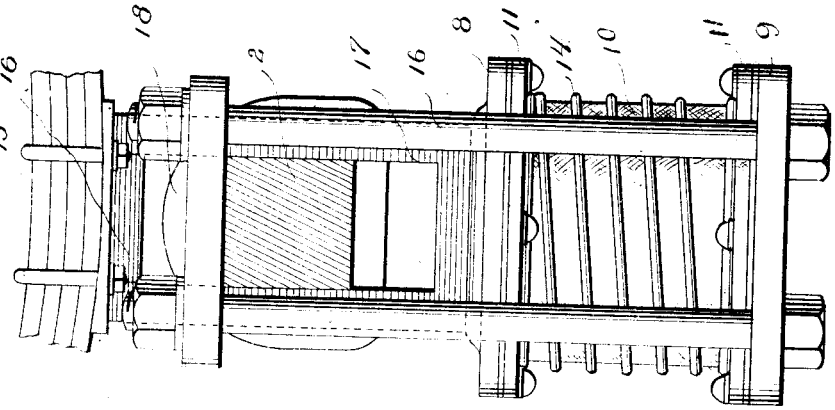
Witnesses
Inventor
S. W. Scott.
By Victor J. Evans
Attorney

UNITED STATES PATENT OFFICE.

S. WALTER SCOTT, OF TROY, NEW YORK.

PNEUMATIC SUPPORT AND SHOCK-ABSORBER FOR VEHICLES.

1,089,974.  Specification of Letters Patent.  Patented Mar. 10, 1914.

Application filed July 17, 1912. Serial No. 709,910.

*To all whom it may concern:*

Be it known that I, S. WALTER SCOTT, a citizen of the United States, residing at Troy, in the county of Rensselaer and State of New York, have invented new and useful Improvements in Pneumatic Supports and Shock-Absorbers for Vehicles, of which the following is a specification.

This invention relates most especially to the cushioning means between the body and the running gear of a vehicle, whether motor-propelled or horse-drawn, the purpose being the provision of pneumatic means of novel construction and peculiar connections between said pneumatic means and the parts attached thereto.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of a pneumatic support embodying the invention, the axle being in section. Fig. 2 is a front view of the parts shown in Fig. 1, end portions of the axle being broken away.

Corresponding and like parts are referred to in the following description, and indicated in both views of the drawing, by the same reference characters.

It is to be understood that the invention is adapted for all types of vehicles irrespective of the nature of the propelling means. A pneumatic support is interposed between the axle and the spring to which the body of the vehicle is attached, it being understood that a pneumatic support is had for each end of each axle and the body supporting springs. The relative position of the pneumatic support is immaterial, since the same may be arranged below or above the axle or between the members of the spring or between such spring and the body of the machine.

The pneumatic support comprises an upper plate 8, a lower plate 9 and an intermediate casing 10 of textile or other flexible material. The ends of the casing 10 are secured in any substantial manner to the plates 8 and 9. As shown a metal ring 11 is had for each end of the casing and a portion of the latter is turned outwardly and clamped between the ring 11 and the plate. A pneumatic bag or sack 12 is placed within the flexible casing 10 and receives the air by means of which the support is inflated. A tube 3 connects with the bag or sack 12 and supplies air thereto. The bag or sack 12 is removed from or inserted into the casing through an opening formed in one of the plates, said opening having a plug 13 fitted therein and said plug in turn having an opening for the passage of the tube 3. A helical spring 14 incloses the casing and serves to strengthen the same, as also to supplement the cushioning effect of the pneumatic support. The lower plate of the pneumatic support is connected directly with the axle 2, whereas the upper plate is connected with the vehicle spring 15. Bolts 16 connect the lower plate 9 with the axle. A pillow 17 is connected with the upper plate 8 and with the vehicle spring 15 and has a limited vertical play with reference to the axle. The pillow 17 is substantially of U form and has its vertical members embracing opposite sides of the axle and prevented from movement along the length of the axle. Shoulders 18 provided upon the axle receive vertical portions of the pillow 17 between them and form guides to direct said pillow in its vertical movements and to prevent any movement thereof lengthwise of the axle. The upper end of the pillow may be clipped or secured in any manner to the vehicle spring 15 so as to move vertically therewith. The pillow 17 forms a connection between the vehicle spring 15 and the pneumatic support and transfers the load from the vehicle spring to the said pneumatic support. Any sudden movement of the axle, due to the wheel dropping into a rut or passing over an obstruction in the road, is received directly by the pneumatic support and is absorbed thereby before being transmitted to the vehicle spring and from the latter to the body of the vehicle.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:

1. A pneumatic support for vehicles comprising upper and lower plates, a flexible casing arranged between the plates and having its end portions outwardly turned, rings for confining the outturned ends of the casing to the respective plates, a pneumatic bag arranged within the casing, bolts for connecting the lower plate to an axle of a vehicle, a U shaped pillow having connection with the upper plate and straddling the axle and having a limited vertical play thereon, an expansible helical spring encircling the casing and having its ends in engagement with the confining rings, and means for connecting the upper end of such pillow with a vehicle spring.

2. A pneumatic support for vehicles, the same comprising upper and lower plates, the upper plate having an opening, a flexible casing arranged between the plates and secured at its ends thereto, a pneumatic bag arranged within the casing, a plug for closing the opening in the upper plate, a tube extending through such plug and having connection with the pneumatic bag, means for connecting the lower plate to an axle of a vehicle, and a connection between the upper plate and the vehicle spring, said connection straddling the axle and having a limited vertical play thereon but prevented from longitudinal movement.

In testimony whereof I affix my signature in presence of two witnesses.

S. WALTER SCOTT.

Witnesses:
 JOSEPH E. HOVER,
 JOHN D. DICKSON.